Patented Sept. 30, 1930

1,776,932

UNITED STATES PATENT OFFICE

ARNOLD SHEPHERDSON, WILLIAM WYNDHAM TATUM, AND HUGH MILLS BUNBURY, OF MANCHESTER, ENGLAND, ASSIGNORS TO BRITISH DYESTUFFS CORPORATION LIMITED, OF MANCHESTER, ENGLAND

PROCESS FOR THE MANUFACTURE OF HALOGENATED ANTHRAQUINONES

No Drawing. Application filed February 10, 1926, Serial No. 87,433, and in Great Britain January 11, 1926.

In obtaining derivatives of 1.4-diamino-anthraquinone, e. g. the dibenzoyl derivative, it has been the practice to synthesize the 1.4-diamino-anthraquinone by starting with 1.-amino-anthraquinone, acetylating, nitrating, and hydrolyzing the 4-nitro-1-acetylamino-anthraquinone thus produced to 1-nitro-4-amino-anthraquinone, and then reducing the nitro group. The 1.4-diamino-anthraquinone thus obtained has been reacted upon in known manner to form the required derivatives.

We now find that if a leuco 1:4-diamino-anthraquinone is treated with benzoylating, halogenating and other agents in the presence of an oxidizing solvent, there is formed the corresponding derivative of 1:4-diamino-anthraquinone and not the derivative of the leuco body. Both oxidation and for instance benzoylation or halogenation take place in one operation. In this process nitro bodies such as nitrobenzene or nitrotoluene are suitable oxidizing solvents. Other oxidizing solvents or agents may be used in addition or substitution. The process is advantageous as two reactions are performed in a single step. It provides a simple and direct synthesis of substances which are important dyestuff intermediates, with isolation of the end product only.

The process is especially advantageous in view of recent developments in the art. In a copending application of one of us (Tatum, Ser. No. 87,447) there is disclosed a new process for the production of leuco 1:4-diamino-anthraquinones from 1:4-dihydroxy or amino-hydroxy anthraquinones. The so produced leuco anthraquinones are converted into valuable dyestuff intermediates by the present process in a simple and advantageous manner. The combination of these two processes provides a means of converting 1:4-dihydroxy or amino-hydroxy anthraquinone into 1:4-diamino-anthraquinone derivatives in a satisfactory and efficient manner.

However the present invention is equally advantageous when leuco compounds prepared by other methods are used. The benefits flowing from oxidizing and benzoylating or halogenating in one step are independent of the source of the leuco compound.

In the present invention the leuco 1:4-diamino-anthraquinone is reacted upon in the presence of an oxidizing solvent, such as nitrobenzene, and the end product isolated directly therefrom by suitable means.

The following examples will serve to illustrate the nature of the invention, but the scope of the invention is not confined to the examples. The parts given are by weight.

*Example 1. Direct conversion of leuco 1.4-diamino-anthraquinone to 1.4-dibenzoyl-diamino-anthraquinone*

170 parts of benzoyl chloride are added to a suspension of 100 parts of leuco 1.4-diamino-anthraquinone in 600 parts of nitrobenzene and the whole heated to 110–140° C. The brown color of the leuco diamine soon changes to red with evolution of hydrochloric acid and on cooling the pure 1.4-dibenzoyl-diamino-anthraquinone comes out of solution in the form of bronzy red crystals. These are collected on a filter, washed with methylated spirits, and dried. The product is pure and can be pasted in known ways for employment as a vat dyestuff.

In the above example other solvents such as nitro-toluene may be employed in place of the nitrobenzene, and the benzoyl chloride may be replaced by other acid chlorides or even by free organic acids, as is illustrated by the following example. This compound probably has the formula:

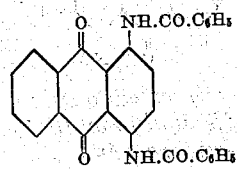

*Example 2. Preparation of anthraquinone-1.4-dioxamic acid from leuco-1.4-diamino-anthraquinone*

A suspension of 100 parts of leuco 1.4-diamino-anthraquinone and 90 parts of anhydrous oxalic acid in 400 parts of nitrobenzene is stirred at 110° C. for 12 hours. Oxidation and condensation take place, and the resultant anthraquinone-1.4-dioxamic acid which crystallizes out may be filtered off and dried. The product may be purified if desired by dissolving it in hot sodium carbonate or ammonia solution, filtering from any insoluble matter, and reprecipitating with acid. This product probably has the formula:

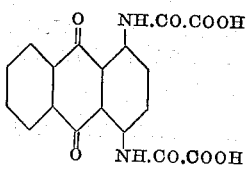

This acid forms a brown powder soluble in caustic soda solution with a red color. On boiling such a solution the oxalic residue is hydrolyzed off and pure 1.4-diamino-anthraquinone is obtained.

*Example 3. Direct conversion of leuco 1.4-diamino-anthraquinone to 2.3-dichloro 1.4-diamino-anthraquinone*

100 parts of leuco 1.4-diamino-anthraquinone are stirred at 35–50° C. with 600 parts of nitrobenzene and treated at this temperature with a current of chlorine gas. If desired a small quantity of a catalyst such as iodine or sulphur may be added. Oxidation and chlorination take place apparently simultaneously, and the liberated hydrochloric acid combines with the 2.3-dichlor 1.4-diamino-anthraquinone to form 2.3-dichlor 1.4-diamino-anthraquinone-hydrochloride. We have found it of importance in securing good yields to stop the current of chlorine as soon as the reaction has proceeded far enough, which is the case when a drop of the melt imparts no purple tinge to boiling water. When this stage has been reached the precipitate is filtered off, neutralized with alcoholic ammonia, and dried. Pure 2.3-dichlor 1.4-diamino-anthraquinone is thereby obtained in good yield directly from leuco 1.4-diamino-anthraquinone. The compound probably has the formula:

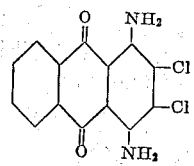

*Example 4. Direct conversion of leuco 1.4-diamino-anthraquinone to 1-amino-4-benzoyl-amino-anthraquinone*

To 10 parts of leuco 1.4-diamino-anthraquinone dissolved in 80 parts of nitrobenzene and raised to 160–180° C., add 12 parts of benzoic anhydride dissolved in 40 parts of nitro-benzene. Maintain at 160° C. with stirring for two hours. Cool, filter, and remove the solvent by washing with alcohol or by steam distillation. Upon drying the filter cake, pure 1-amino-4-benzoylamino-anthraquinone is obtained in excellent yield.

The compound probably has the formula:

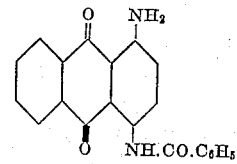

From the filtrate a recovery of benzoic acid may be made if desired.

We claim:—

1. In the manufacture of halogenated 1:4-diamino-anthraquinones directly from leuco 1:4-diamino-anthraquinones, the process which comprises treating a leuco 1:4-diamino-anthraquinone with a halogenating agent in the presence of a solvent having oxidizing properties.

2. In the manufacture of halogenated 1:4-diamino-anthraquinones directly from leuco 1:4-diamino-anthraquinones, the process which comprises treating a leuco 1:4-diamino-anthraquinone with a halogenating agent in the presence of a liquid aromatic nitro compound as an oxidizing solvent.

3. In the manufacture of halogenated 1:4-diamino-anthraquinones, directly from leuco 1:4-diamino-anthraquinones, the process which comprises treating a leuco 1:4-diamino-anthraquinone with a halogenating agent in the presence of nitrobenzene.

4. In the manufacture of chlorinated 1:4-diamino-anthraquinones directly from 1:4-diamino-anthraquinones the process which comprises treating leuco 1:4-diamino-anthraquinone with chlorine in the presence of a liquid aromatic nitro compound as an oxidizing solvent.

5. In the manufacture of chlorinated 1:4-diamino-anthraquinones directly from leuco 1:4-diamino-anthraquinones, the process which comprises treating leuco 1:4-diamino-anthraquinone with chlorine in the presence of nitrobenzene.

In testimony whereof we have hereunto affixed our signatures.

ARNOLD SHEPHERDSON.
WILLIAM WYNDHAM TATUM.
HUGH MILLS BUNBURY.